Aug. 2, 1938.  F. J. WESTROPE ET AL  2,125,761
DECK DOOR
Filed June 1, 1936  3 Sheets-Sheet 1
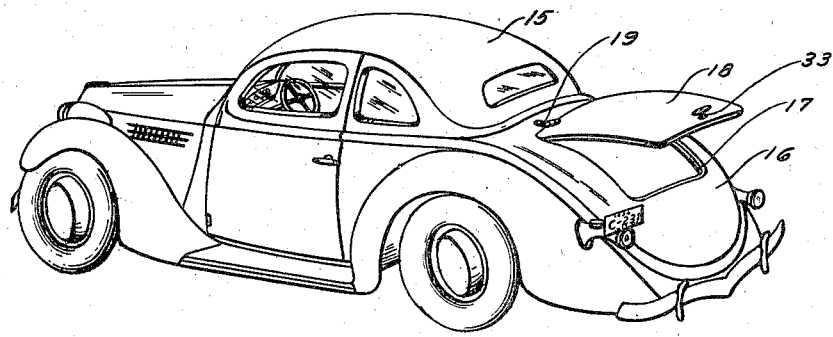
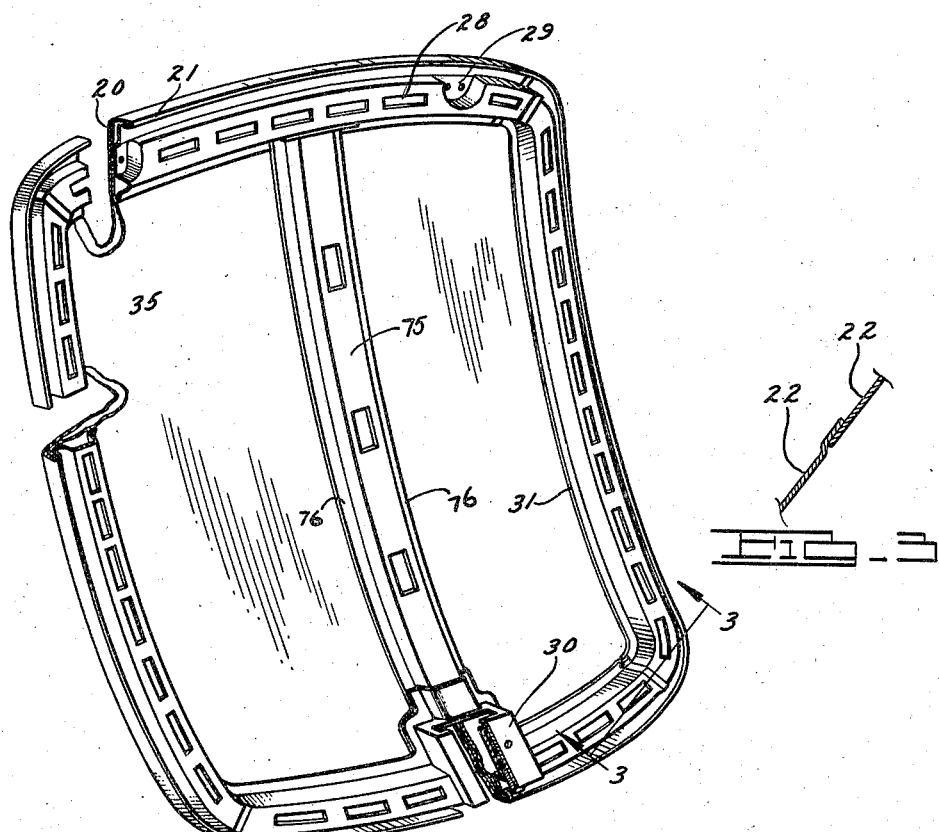
INVENTORS
FRED J. WESTROPE
JAMES VEHKO
ATTORNEY.

Aug. 2, 1938.  F. J. WESTROPE ET AL  2,125,761
DECK DOOR
Filed June 1, 1936  3 Sheets-Sheet 2
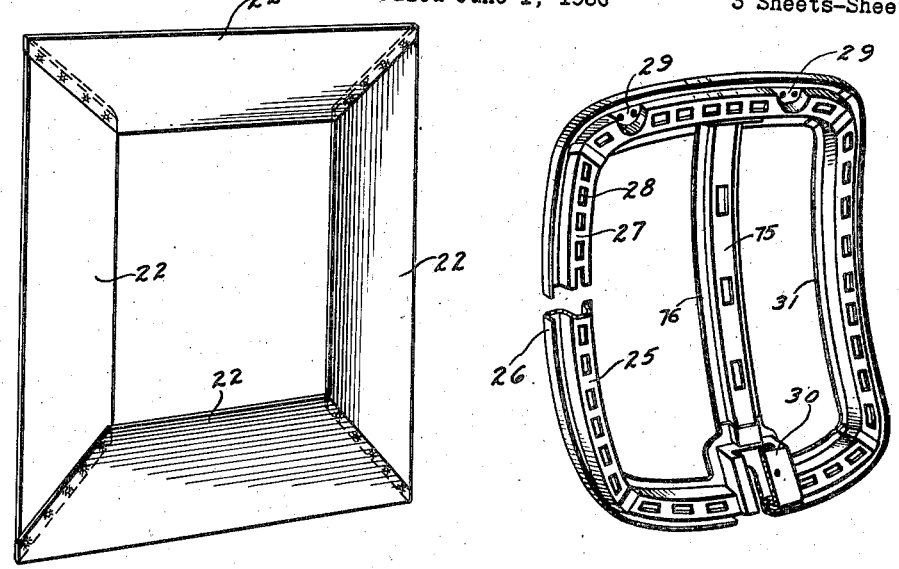
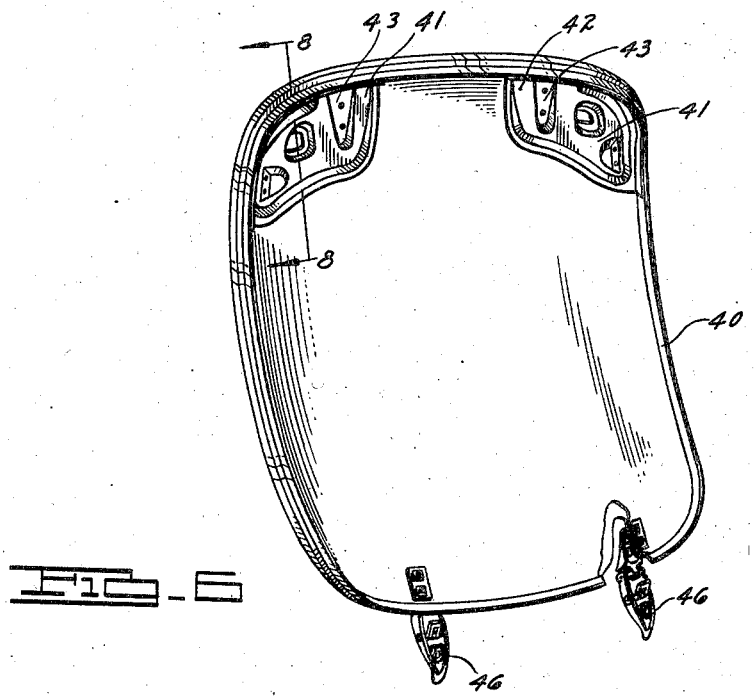
INVENTORS
FRED J. WESTROPE
JAMES VEHKO
BY
Harness Dickey Pierce & Hann
ATTORNEY.

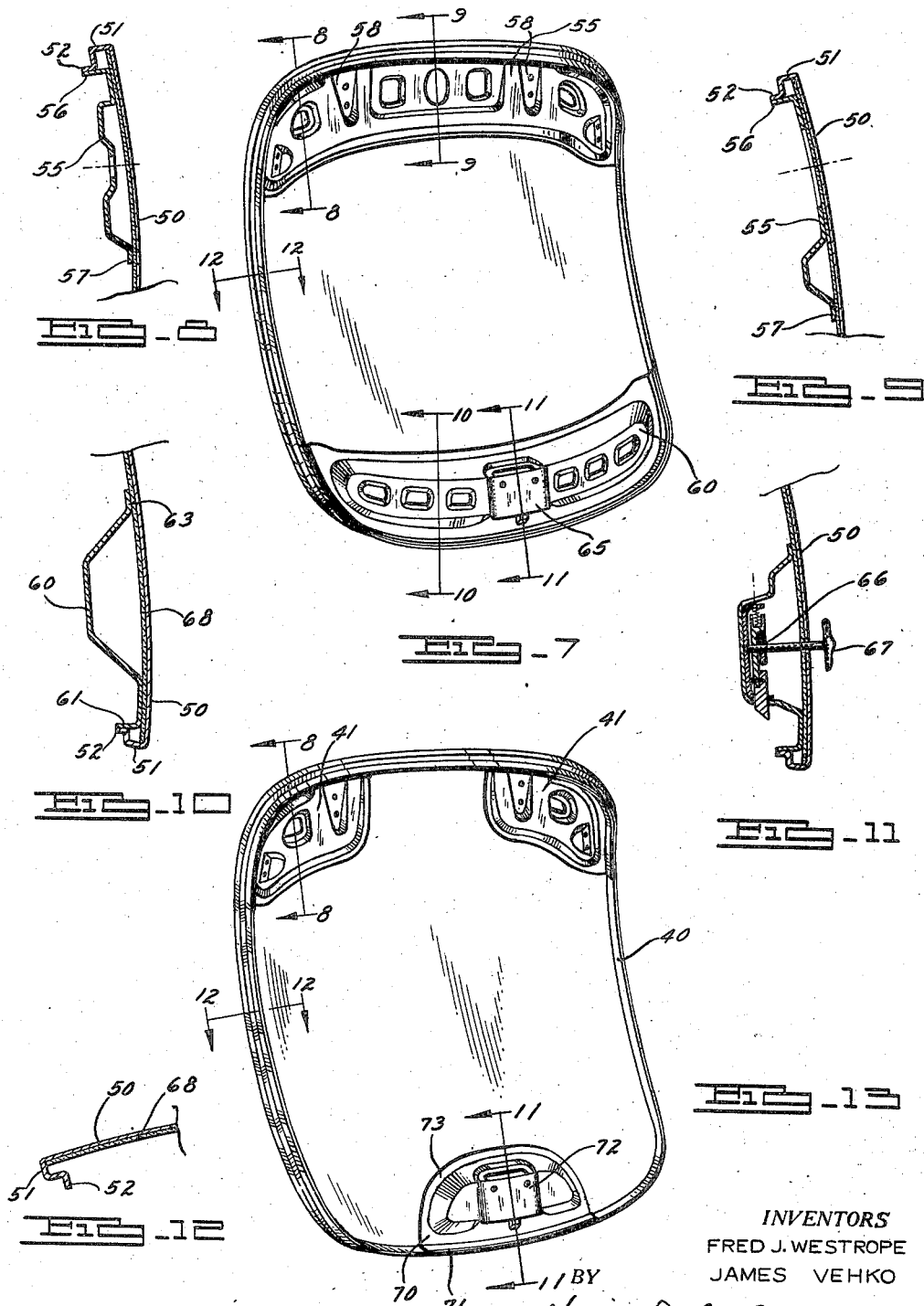

Patented Aug. 2, 1938

2,125,761

UNITED STATES PATENT OFFICE 2,125,761

DECK DOOR

Fred J. Westrope and James Vehko, Detroit, Mich., assignors to The Murray Corporation of America, a corporation of Delaware Application June 1, 1936, Serial No. 82,900

9 Claims. (Cl. 296—44)

The present invention relates to deck door constructions. More particularly, it relates to a novel and improved form of deck door construction, particularly adaptable for use in connection with two seater automotive vehicle bodies for closing the rumble seat or rear luggage compartment.

It has long been well appreciated that these deck doors must have substantial inherent strength and rigidity and yet be of relatively light weight construction in order that they may be conveniently mounted and easily operated. Heretofore it has been necessary in the construction of deck doors of this generic type, to utilize two sheet metal stampings substantially coextensive in configuration, these stampings being welded together to provide a double walled structure. The inner of the two stampings is generally cut out in a substantial portion of its central area in order to give the lightness necessary for deck door constructions of this type. The cutting out of this central portion of the structure results in a waste of metal and consequent increased expense, which the present invention seeks in the main to avoid.

It is a primary object of the present invention to provide a deck door construction which is extremely simple, strong, rugged, easily and conveniently assembled and, when completed, extremely light in weight and satisfactory in appearance.

The present invention contemplates the provision of a single sheet metal panel stamped out to provide the reveal portion of the deck door and preformed in its marginal edge to reinforce the door structure as a whole. This sheet metal stamping is reinforced by scrap metal parts which are stamped to cooperate therewith to provide the reinforcement necessary at these various parts of the door to obtain the required strength and rigidity.

It will be clearly appreciated from the following description that the deck door construction manufactured in accordance with the present invention clearly eliminates the necessity of utilizing two sheet metal sections as large as the deck door, and that the reinforcing portions of the deck door construction may be easily and conveniently fabricated from scrap material of varying sizes and sections of sheet material which would otherwise normally be wasted.

In one form the present invention contemplates the provision of a plurality of scrap sheet metal sections welded together to form a structure for reinforcing the entire marginal edge of the improved deck door. After welding the parts together, the assembled structure is stamped out to the desired form and secured in position with respect to the reveal portion of the deck door construction.

The present invention further contemplates the provision of a novel reinforcing structure for deck doors of this generic class in which the reinforcing members secured to the inner side of the deck door panels are utilized not only for the purpose of strengthening the panel, but also for the purpose of permanently and securely retaining a piece of soundproofing material in position thereon.

Many other objects and features of novelty will become clearly apparent from the following specification when considered in connection with the accompanying drawings forming a part thereof.

In the drawings:

Figure 1 illustrates in perspective an automobile body construction of the type embodying a deck door of the present invention;

Fig. 2 is an enlarged rear perspective view of one form of the improved deck door construction of the present invention;

Fig. 3 is an enlarged, fragmentary, sectional view, taken substantially on the line 3—3 of Fig. 2, illustrating in detail the joint between the various sections of scrap material making up the reinforcing member for the improved deck door;

Fig. 4 is a perspective view of a blank formed of a plurality of sections of scrap material sesured together, from which the reinforcing member for the improved deck door may be stamped out;

Fig. 5 is a perspective view, showing one form of reinforcing member which may be stamped out from the blank shown in Fig. 4 to provide reinforcement for the improved deck door construction;

Fig. 6 is a rear perspective view of a modified form of deck door construction in which modified sections are utilized for the purpose of providing reinforcement for the reveal panel of the deck door;

Fig. 7 is a rear perspective view of a still further modified form of the invention in which still further modified reinforcing members are utilized for the purpose of strengthening the reveal portion of the improved deck door construction;

Fig. 8 is an enlarged sectional view, taken substantially on the line 8—8 of Fig. 7, illustrating in detail the cross sectional configuration of the improved reinforcing member;

Fig. 9 is an enlarged, transverse, sectional view, taken substantially on the line 9—9 of Fig. 7, illustrating in detail the cross sectional configuration of the modified form of reinforcing member and showing the manner in which it is applied to the reveal panel and the manner in which it secures the soundproofing material in position with respect thereto;

Fig. 10 is an enlarged sectional view, taken substantially on the line 10—10 of Fig. 7, illustrating in detail the cross sectional configuration of one of the reinforcing members and the manner in which this reinforcing member secures the soundproofing material in position with respect to the reveal portion of the deck door;

Fig. 11 is an enlarged, transverse, sectional view, taken substantially on the line 11—11 of Fig. 7, illustrating in detail the manner in which the latch mechanism is mounted in the improved reinforcing member;

Fig. 12 is an enlarged, transverse, sectional view, taken substantially on the line 12—12 of Fig. 7, illustrating in detail the cross sectional configuration of the reinforced marginal edge of the deck door shown in Fig. 7;

Fig. 13 is a rear perspective view of a still further modified form of deck door construction, illustrating a still further modified arrangement and construction of reinforcing members secured in position thereon.

With more particular reference to the specific embodiment of the invention disclosed in the drawings, it will be clear by reference to Fig. 1 that the present invention, while finding broad and practical utility for many other purposes and applications, is primarily directed to a deck door construction for automotive vehicle bodies adapted to enclose the luggage space at the rear portion thereof. With reference to Fig. 1, the improved deck door construction is illustrated in connection with a conventional automobile of the coupé type.

As is conventional in constructions of this general character, the automobile 15 is provided with a rear deck 16 sloping arcuately downwardly and rearwardly from the top of the vehicle. This rear deck 16 is provided with a generally rectangular opening 17 therein, which opening, as is conventional, provides access to the luggage compartment in the rear portion of the vehicle body. In conventional constructions, the opening 17 is generally rectangular in shape and is provided with generally rounded corners and, while not essential, it has been generally found desirable to preform the paneling around the marginal edge of this opening to provide an upwardly presented drip channel in which a suitable flange on the deck door, hereinafter described in detail, is adapted to seat in order that the closure of the improved deck door with respect to the channel 16 will be substantially water-tight.

As is seen in Fig. 1, the opening 17 is adapted to be closed by a deck door 18 having an outer configuration adapted to mate with the opening 17 and secured in cooperative relation thereto by means of a suitable pair of hinges 19 which, for purposes of illustration, are shown as of the strap type.

With particular reference to the form of the invention illustrated in Figs. 1 to 5, inclusive, of the drawings, it will be seen that the improved deck door construction comprises an outer or reveal panel 20 which is formed of a single sheet of metal and is stamped to a configuration adapted to mate with the opening 17 in the rear deck 16 of the automobile with which it is intended to be associated. In the preferred embodiment of the invention, the reveal panel 20 is preformed in its marginal edge to provide a laterally extending flange 21 around the peripheral edge of the panel, which flange, as will hereinafter be more clearly seen, is utilized for the purpose of locking the reinforcing member in position with respect to this panel.

The reveal panel 20 is strengthened by means of a reinforcing member shown in detail in Fig. 5. For the sake of economy it has been found particularly desirable to form this reinforcing member from a plurality of sections of scrap sheet metal 22 welded together in overlapping relation to provide a generally rectangular sheet of substantially the same size as the reveal panel with which the reinforcing member is to be associated. In order that the composite structure thus formed will lie in substantially a plane surface, it has been found desirable, prior to the securement of these sections of scrap metal together, to offset the marginal edges of the sheet substantially in the manner shown in the sectional view, Fig. 3, in order that the composite structure formed will lie substantially in a single plane. After the sections of scrap metal 22 have been welded together to provide a substantially integral rectangular structure of a configuration of the same general size and shape as the deck door with which it is to be associated, the sheet is blanked out to provide a reinforcing member substantially as is shown in the perspective view, Fig. 5. This reinforcing member 25 is flanged in its peripheral edge to provide a flange 26 adapted to lie substantially parallel with and mate with the flange 21 on the marginal edge of the reveal panel 20. The body portion of the reinforcing member 25 is preformed to provide a channel-like structure 27 extending entirely around the reinforcing member and, in order to make the reinforcing member as light as possible, the base portion of this channel structure 27 may have a plurality of sections cut out therefrom to leave apertures 28. These cut-out portions serve to lighten the structure without materially decreasing its strength.

Adjacent its upper edge the channel member is preformed to provide a pair of recesses 29 which form flat surfaces for the securement of hinges as may be desired and adjacent its lower marginal edge, the reinforcing member is preformed to provide a housing 30 adapted to enclose the conventional latch mechanism utilized in connection with deck doors of this type. The inner marginal edge of the reinforcing member is preformed to provide a flange 31 adapted to lie substantially in the plane of the reveal portion of the deck door with which the reinforcing member is associated. The function and purpose of this inwardly projecting flange will be more clearly apparent from the following description.

In the assembly of the improved deck door construction, the reveal panel 20 is provided with a section of suitable fibrous, soundproofing material 35 stamped out to a configuration to substantially cover the interior surface of the reveal panel. Suitable latch mechanism, as is conventional in the art, is mounted in the housing 30 and this latch mechanism is provided with a handle 33 which is adapted to extend through a suitable aperture provided in the reveal panel 20. The reinforcing member 25 is telescoped within the reveal panel 20, the flange 26 of the reinforcing member mating with the flange 21 surrounding the peripheral edge of the reveal panel 20. It will be seen, by reference to Fig. 2 of the drawings, that the flange 21 surrounding the peripheral edge of the reveal panel 20 is substantially wider than the flange 26 surrounding the peripheral edge of the reinforcing member and, consequently, in the assembled relation, this flange 21 will extend substantially beyond the flange 26 on the reinforcing member. The reinforcing member and reveal panel are pressed into engagement sufficiently tightly that the flange 31 on the inner marginal edge of the reinforcing member will securely engage the soundproofing material 35 and retain this sheet of soundproofing material closely in engagement with the surface of the reveal panel 20. The marginal edge of the flange 21 is then crimped over the edge of the flange 26 on the reinforcing member, thus locking the reinforcing member firmly in position with respect to the reveal panel, and, consequently, locking the soundproofing material 35 firmly in position thereon. After this assembly operation, the hinges 19 may be connected to the deck door by means of suitable bolts passing through both the reveal panel 20 and the reinforcing member 25, and the deck door may then be conveniently mounted in position in a vehicle rear deck.

From the foregoing, it will be appreciated that the improved deck door thus formed serves to provide a deck door construction which is thoroughly and effectively reinforced around the marginal edge thereof in order to provide the strength and rigidity necessary in constructions of this kind. Further, it will be apparent that the reinforcing member utilized for this purpose is conveniently fabricated from a plurality of relatively small sections of sheet metal which might otherwise be waste material. Still further, it is apparent that the construction provides one in which the reinforcing member is firmly locked in position with respect to the reveal panel with which it is associated and not only serves to materially strengthen the same around the marginal edges thereof, but serves to provide convenient means for positioning soundproofing material with respect to said reveal panel.

In the modified form of the invention illustrated in Fig. 6, a deck door construction is shown embodying some of the same novel principles described in connection with the preferred embodiment of the invention discussed above. In this form of the invention, a section of the sheet metal is blanked out to provide a reveal panel 40. As this panel is stamped out, it is preformed around its marginal edge to provide a channel structure presenting inwardly toward the center of the panel and one leg of the channel is bent to provide a flange extending from the panel. A pair of reinforcing sections 41 are blanked out to a configuration adapted to provide reinforcements for the upper corners of the deck door thus formed, and it will be seen that these sections 41 are provided with flanges 42 adapted to mate with the outwardly projecting flanges on the marginal edge of the reveal panel 40. These reinforcing members 41 may be securely welded in position with respect to the reveal panel, and it will be appreciated that, due to the inwardly presenting channel formed in the marginal edge of the reveal panel, these reinforcing members will, when secured to the flange at the peripheral edge of the reveal panel, provide a structure of hollow box section at the upper corners of the deck door, and generally strengthen the structure as a whole. The reinforcing members 41 may be preformed to provide recesses 43 which serve to provide means for mounting hinges on the deck door for the purpose of securing the same in position with respect to the vehicle with which it is associated. In this type of deck door construction, the marginal edge is preformed in such a manner that substantial strength and rigidity are obtained for the panel as a whole and further reinforcement is not found necessary. As was the case in connection with the preferred embodiment of the invention described above, the panel 40 may be provided with a substantially coextensive section of soundproofing material locked in position on the inner surface thereof by means of the reinforcing members 41. Suitable closure latches 46 may be bolted to the surface of the reveal panel 40 adjacent the lower marginal edge thereof in order to retain the deck door in closed position when it is mounted on a vehicle body.

In the form of the invention illustrated in Figs. 7 to 12, inclusive, a deck panel construction is shown embodying some of the novel features of both embodiments of the invention described above.

In this form of the invention, it will be seen that a reveal panel 50 stamped from a single section of sheet metal is provided, which is preformed to provide an inwardly presenting channel structure 51 surrounding the entire peripheral edge thereof. The outer leg of this channel 51 is preformed to provide an outwardly extending flange 52 extending substantially at right angles from the surface of the body of the panel 50. A section of sheet metal is stamped out to provide a reinforcing member 55 for the top portion of the panel. This reinforcing member has the body portion thereof preformed to provide a structure of greatly increased strength and is provided throughout its upper edge with an outwardly extending flange 56 adapted to mate with the flange 52 on the peripheral edge of the reveal panel 50. The lower marginal edge of the reinforcing member 55 is provided with a flange 57 adapted to lie substantially parallel to the body portion of the reveal panel 50. As has been described above, this reinforcing member 55 may be preformed to provide recesses 58 which serve to lie substantially parallel to and adjacent the body portion of the reveal panel in order to provide an area of double walled thickness for the purpose of securing hinges in position with respect to the deck door construction as a whole. A reinforcing section 60 is provided of a configuration adapted to mate with the lower end portion of the deck door 50 and this reinforcing member, 60 as is clearly seen in the sectional views, Figs. 10 and 11, is preformed in its lower marginal edge to provide an outwardly projecting flange 61 adapted to mate with the outwardly projecting flange 52 formed on the marginal edge of the channel structure 51 at the peripheral edge of the deck panel 50. The upper edge of the reinforcing member 60 is provided with a flange 63 adapted to lie substantially parallel to the body portion of the reveal panel 50. The central portion of the reinforcing member 60 is preformed to provide a housing 65 for the reception of the conventional latch mechanism 66 utilized in connection with deck door constructions of this general type, and it will be seen that the latch mechanism 66 is provided with the usual operating handle 67 secured to the end of the shaft extending through the reveal panel 50 of the deck door.

In the assembly of the improved deck door construction shown in Figs. 7 to 12, inclusive, it will be seen that a section of suitable fibrous, soundproofing material 68 is blanked out to a configuration substantially the same as the configuration of the body portion of the reveal panel 50. This soundproofing material is seated in place with its marginal edge seated in the channel 51 surrounding the peripheral edge of the reveal panel 50. The reinforcing members 55 and 60 are then inserted in place and welded in position by means of spot-welding through the adjacent flanges 52 and 56, and through the mating flanges 52 and 61. The reinforcing members are preferably preformed so that when these mating flanges are welded together, the flanges 57 and 63 will be tensioned to exert substantial pressure on the soundproofing material 68 to retain the same in position.

From the foregoing it will be appreciated that the deck door thus formed is provided with reinforcing members throughout the top and bottom edges, throughout portions of the side edges, and that the marginal edge of the reveal portion of the panel is so constructed and arranged with respect to these reinforcing members that a structure of hollow box section is provided surrounding a substantial portion of the periphery of the panel.

In the modified form of the invention illustrated in Fig. 13, the structure shown is substantially similar to that illustrated in Fig. 6 and described above. In this form of the invention, the reveal panel 40 is provided with reinforcing members 41 at the upper corners thereof and, as has been described above, these reinforcing members 41 not only serve to reinforce the corner structures and provide a box section structure in each of the upper corners, but also serve to provide a structure of double walled thickness for securing the hinges in position and at the same time serve to provide means for permanently retaining the soundproofing material in position with respect to the reveal portion of the deck door construction. In this form of the invention, a reinforcing member 70 is provided. This reinforcing member 70 is preformed in its lower marginal edge to provide a flange 71 which is adapted to mate with the flange at the marginal edge of the panel 40 and to be secured thereto by spot-welding or other suitable means. The reinforcing member 70 is preformed in its central portion to provide a housing 72 for enclosing the conventional latch mechanism and is provided around the remainder of its edges with a flange 73 adapted to lie substantially parallel to the body portion of the panel 40 and aid in retaining the soundproofing material in position with respect thereto. In the panel constructed in accordance with this teaching, it will be appreciated that the deck door construction thus formed is reinforced throughout the points where it is apt to be exposed to strain and that the marginal edge of the panel has been preformed to provide a structure of great strength and rigidity.

In deck door constructions of the type shown herein and particularly in connection with the forms of the invention shown, in which a single, centrally disposed latch mechanism is used, it has been found desirable to employ a longitudinal brace to provide additional stiffness for the structure as a whole. This longitudinal brace has been found particularly effective in strengthening the door against twisting strains such as may result from the application of force to the corners of the door. While such longitudinal braces may be conveniently employed in all forms of the invention shown, by way of illustration, the brace member has been shown as applied to the form of the invention shown in Figs. 1 to 5 of the drawings.

While the brace member may take any desired form, in the drawings is shown a sheet metal member 75 of generally channel cross section, secured at its ends to the channel member 22. It will be seen that the channel member 22 is preformed to provide a secure mounting and convenient mating surfaces for securement of the brace member.

The brace member 75 is arched to lie closely adjacent the deck panel 35 and may be flanged at 76 to aid in securing the soundproofing material in position.

Further, it will be appreciated that all of the modifications of the invention shown herein provide panels of relatively simple and cheap construction which may be easily and conveniently manufactured and which require a minimum amount of material in order to obtain the strength characteristics necessary and desirable in structures of this kind.

The term "reveal panel" as used in the foregoing specification and in the subjoined claims is intended to include the sheet metal panels or members which have at least a substantial portion thereof constituting the exterior or exposed surfaces of the vehicle body in its completed form.

The above embodiments of the invention are merely illustrative of the generic inventive concept presented herein. Many other and further modifications of the invention falling within the scope of the subjoined claims will be apparent to those skilled in the art.

We claim as our invention:

1. A deck door construction comprising a reveal panel preformed to provide a laterally extending flange about its peripheral edge, a reinforcing member including a plurality of sections of sheet metal welded together and stamped to a configuration adapted to mate with said reveal panel, said reinforcing structure having a marginal flange adapted to mate with the flange on said reveal panel, said flanges being locked together to assemble said reinforcing structure with said reveal panel, and a longitudinally extending brace of generally channeled section extending across said reinforcing structure and having flanges adapted to lie closely adjacent the interior surface of said reveal panel, said reinforcing structure and brace serving to retain a section of soundproofing material closely adjacent the interior surface of said panel.

2. A deck door construction comprising a reveal panel blanked out to provide an inwardly presenting channel around its marginal edge, a laterally projecting flange on one leg of said channel, and a sheet metal reinforcing member extending across one side of said panel, said reinforcing member having a flange in its marginal edge adapted to mate with the flange on the edge of the channel structure of said reveal panel, and said reveal panel and reinforcing structure together providing a structure of hollow box section adjacent the edge of the panel.

3. A deck door construction comprising a reveal panel preformed to provide a channel presenting inwardly around the marginal edge thereof, a flange on one leg of said channel extending substantially perpendicularly to the body of said panel, and a reinforcing member having portions adapted to lie adjacent the inner surface of said panel and having a flange adapted to mate with the flange on said panel, said members being secured together through said mating flanges and providing a structure of hollow box section adjacent the marginal edge of said panel.

4. A deck door construction comprising a reveal panel preformed to provide a channel presenting inwardly around the marginal edge thereof, a flange on one leg of said channel extending substantially perpendicularly to the body of said panel, a reinforcing member having portions adapted to lie adjacent the inner surface of said panel and having a flange adapted to mate with the flange on said panel, said members being secured together through said mating flanges and providing a structure of hollow box section adjacent the marginal edge of said panel, and a section of soundproofing material disposed on the interior surface of said panel and retained in position by said reinforcing member.

5. A deck door construction comprising a reveal panel preformed to provide a channel presenting inwardly around the marginal edge thereof, a flange on one leg of said channel extending substantially perpendicularly to the body of said panel, a reinforcing member having portions adapted to lie adjacent the inner surface of said panel and having a flange adapted to mate with the flange on said panel, said members being secured together through said mating flanges and providing a structure of hollow box section adjacent the marginal edge of said panel, and a section of soundproofing material disposed over the inner surface of said reveal panel, the securement of said mating flanges effecting a tensional engagement of said reinforcing member with said soundproofing material to firmly retain the same in position.

6. A deck door construction comprising a reveal panel preformed around its marginal edge to provide a structure of inwardly presenting channel section, a flange formed on one leg of said channel and projecting therefrom in a direction substantially perpendicular to the body of said panel, and a reinforcing member having portions adapted to lie closely adjacent the body of said panel and having a flange adapted to mate with and be secured to the flange on said panel, thus providing a structure of hollow box section around a portion of the marginal edge of said panel.

7. A deck door construction comprising a reveal panel preformed around its marginal edge to provide a structure of inwardly presenting channel section, a flange formed on one leg of said channel and projecting therefrom in a direction substantially perpendicular to the body of said panel, and a reinforcing member having portions adapted to lie closely adjacent the body of said panel and having a flange adapted to mate with and be secured to the flange on said panel, thus providing a structure of hollow box section around a portion of the marginal edge of said panel, and said reinforcing member being preformed in its central portion to provide a housing for latch mechanism.

8. A deck door construction comprising a reveal panel preformed around its marginal edge to provide a structure of inwardly presenting channel section, a flange formed on one leg of said channel and projecting therefrom in a direction substantially perpendicular to the body of said panel, and a reinforcing member having portions adapted to lie closely adjacent the body of said panel and having a flange adapted to mate with and be secured to the flange on said panel, thus providing a structure of hollow box section around a portion of the marginal edge of said panel, and said reinforcing member being preformed to provide spaced portions lying closely adjacent the body of said reveal panel to provide portions of double thickness for the securement of hinges for mounting said door.

9. A deck door construction comprising a reveal panel preformed to provide a flange around the marginal edge of said panel, said flange extending substantially perpendicularly to the body of said panel, a sheet metal reinforcing member extending across one side of said panel, said reinforcing member having a flange in its marginal edge adapted to mate with the flange on the edge of said reveal panel, soundproofing material covering the entire inner surface of said reveal panel, said reinforcing member resiliently engaging said soundproofing material to retain the same in position.

JAMES VEHKO.
FRED J. WESTROPE.